US005323774A

United States Patent [19]

Fehlauer

[11] Patent Number: 5,323,774

[45] Date of Patent: Jun. 28, 1994

[54] BREATHING MASK WITH AN INDICATOR SIGNALLING PENETRATION OF A TOXIC SUBSTANCE INTO THE MASK

[75] Inventor: Kai-Uwe Fehlauer, Lübeck, Fed. Rep. of Germany

[73] Assignee: Drägerwerk AG, Lübeck, Fed. Rep. of Germany

[21] Appl. No.: 21,245

[22] Filed: Feb. 23, 1993

[30] Foreign Application Priority Data

Apr. 30, 1992 [DE] Fed. Rep. of Germany ....... 4214239

[51] Int. Cl.$^5$ ........................ A62B 7/10; A62B 18/08; A62B 23/02; G01D 21/00

[52] U.S. Cl. .......................... 128/206.12; 128/205.23; 128/205.25; 128/202.22; 116/206

[58] Field of Search ...................... 128/202.22, 205.23, 128/205.25, 206.12, 206.16, 206.17, 206.21, 206.24, 205.26–205.28, 202.27

[56] References Cited

U.S. PATENT DOCUMENTS

| | | | |
|---|---|---|---|
| 3,018,611 | 1/1962 | Biritz | 116/206 |
| 4,205,043 | 5/1980 | Esch et al. | 116/206 |
| 4,595,003 | 6/1986 | Shoemaker et al. | 128/201.25 |
| 4,676,236 | 6/1987 | Piorkowski et al. | 128/201.25 |
| 4,741,332 | 5/1988 | Beaussant | 128/201.25 |
| 4,873,970 | 10/1989 | Freidank et al. | 128/206.12 |
| 4,928,687 | 5/1990 | Lampotang et al. | 128/205.23 |
| 5,018,518 | 5/1991 | Hübner | 128/206.12 |

FOREIGN PATENT DOCUMENTS

| | | | |
|---|---|---|---|
| 2168259 | 6/1986 | United Kingdom | 128/205.29 |
| 8907957 | 9/1989 | World Int. Prop. O. | 128/205.23 |

*Primary Examiner*—Kimberly L. Asher
*Attorney, Agent, or Firm*—McGlew and Tuttle

[57] ABSTRACT

A breathing mask with a mask interior, through which the respiration air flows, and with a detection device with an indicator for indicating the presence of a toxic substance having penetrated into the breathing mask, is to be improved such that the indicator can be activated when the breathing mask has been put on. To accomplish this task, the detection device (1), which gastightly surrounds the indicator (6), has an operating means (5), which can be operated from the outside (21) of the mask, and with which the indicator (6) can be brought into contact with the respiration air in the mask interior (22) when the breathing mask has been put on.

10 Claims, 2 Drawing Sheets

BREATHING MASK WITH AN INDICATOR SIGNALLING PENETRATION OF A TOXIC SUBSTANCE INTO THE MASK

FIELD OF THE INVENTION

The present invention pertains to a breathing mask with a mask interior, through which the respiration air flows, and a detection device with an indicator for the indication of the presence of a toxic substance having penetrated into the breathing mask.

BACKGROUND OF THE INVENTION

A breathing mask of this class has become known from German Patent No. DE-PS 962,313. An indicator, which indicates whether the filter insert attached to the mask still retains toxic gases to a sufficient extent, is arranged on the breathing mask in the visual range of the mask user. The indicator is applied to a support and is freely exposed to the gas present in the interior of the mask.

The prior-art indicator is intended preferably for detecting exhaustion of the filter, and displays a color reaction when toxic substances have penetrated into the interior of the mask. In a first embodiment, the support with the indicator is arranged directly on the inside of the mask window, and in a second embodiment, individual windows are provided in the area of the mask body, and the support with the indicator is arranged under these windows. Together with the indicator on the support, the windows form a detection device for the toxic substance.

One disadvantage of the prior-art detection device is that toxic substances may reach the indicator even before the breathing mask is put on. However, it is necessary for certain applications, e.g., during the testing of breathing masks, to activate the indicator only after the mask has been put on, in order for the color reaction not to take place under the effect of possible toxic components already present in the ambient atmosphere.

A dosimeter with an indicator layer exposed to the substance to be detected has become known from Canadian Patent CA-A 1,271,399. The indicator layer is covered with a strip that can be peeled off, which is to prevent the substance to be detected from reaching the indicator layer. The strip is peeled off before use, as a result of which the indicator layer will be exposed to the substance to be detected.

The prior-art dosimeter is used such that it is always directly accessible, i.e., the strip covering the indicator layer can be pulled off by the user immediately before putting into operation. Activation of such a dosimeter in a room not accessible to the user is not disclosed in this document.

SUMMARY AND OBJECTS OF THE INVENTION

The basic object of the present invention is to improve a detection device with an indicator for indicating the presence of a toxic substance having penetrated into the breathing mask such that the indicator can be activated with the breathing mask put on.

This object is attained by the detection device, which gas-tightly surrounds the indicator, having an operating means that can be operated from the outside of the mask, with which the indicator can be brought into contact with the respiration air in the interior of the mask when the breathing mask has been put on.

The advantage of the present invention is essentially the fact that the indicator accommodated in the detection device is initially gas-tightly encapsulated and cannot be damaged in advance by a toxic substance that may be present in the ambient atmosphere. The detection device is advantageously arranged on the inside of a breathing mask such that a toxic substance having penetrated into the interior of the mask can be detected with the indicator. Toxic substances may enter the interior of the mask through, e.g., leaks between the breathing mask and the mask user's face. By means of an operating means, which can be operated by the mask user or by another person, the indicator can be brought into contact with the respiration air in the interior of the mask when the breathing mask has been put on, i.e., the indicator is released from the detection device, e.g., by removing or slitting open an envelope that air-tightly covers the indicator. The operating means may be of a guided bar, a pull strip or pull strap, which is led out of the interior of the mask to the outside of the mask, or can be operated from the outside of the mask. The detection device may be directly integrated within the mask wall, i.e., in the form of a depression, which is provided with the indicator substance. The envelope, which is slit open or removed with the operating means, a bar or a pull strap or even a rotary slide valve device from the outside of the mask, is located above the indicator.

The operating means may advantageously also be designed directly as a strip-like protective cover for the indicator, e.g., as a film strip, which is led to the outside of the mask, and the indicator is released by pulling on the film strip.

The detection device preferably has a holder with a film acting as a protective cover for the indicator, which holder is spanned over two deflecting pins, and a bar, which is guided in the holder and is covered over at least partly by the film, is provided, wherein the indicator covered by the film is arranged at the first end side of the bar in a readiness position of the detection device, and the other end side of the bar is directed toward the outside of the mask, and the bar can be brought into an operating position indicating the toxic substance from the overlap area of the film by a pushing movement of the bar from the outside of the mask.

It is advantageous to attach the detection device on an inner mask of the breathing mask.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
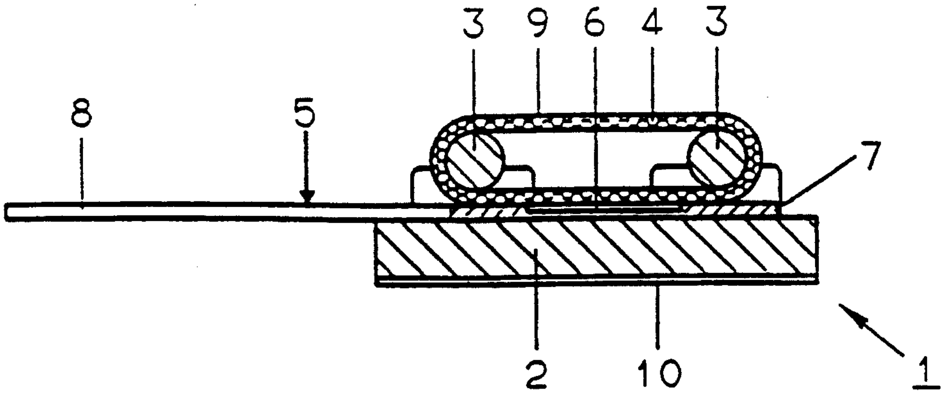
FIG. 1 is a side view of a detection device in the readiness position.

FIG. 1 shows the side view of a detection device 1 for indicating a toxic substance.

The detection device 1 includes a holder 2 with two deflecting pins 3, a film 4 placed as an endless strip around the deflecting pins 3, and an axially movable bar 5 guided in the holder 2 with the indicator 6. In the readiness position of the detection device 1 shown in FIG. 1, the indicator 6 is covered by the film 4 in the form of a protective cover, as a result of which the access of toxic gases to the indicator 6 is prevented. The indicator 6 is located at a first end side 7 of the bar 5, and a second end side 8 is directed toward a mask wall (not shown in FIG. 1) of a breathing mask, which is also not shown in FIG. 1. The film 4 has a circumferential adhesive layer 9, which lies on the indicator 6 and seals same air-tightly. An adhesive layer 10, with which the detection device 1 can be attached to a breathing mask (not shown in FIG. 1) in the interior, is arranged on the underside of the holder 2.

Figure 2:
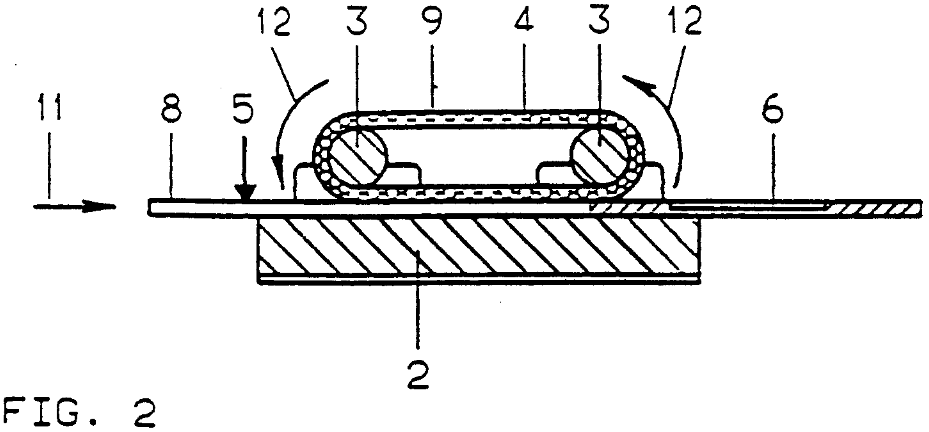
FIG. 2 is a side view showing the detection device according to FIG. 1 in the operating position.

FIG. 2 shows the detection device 1 in the operating position. The passage from the readiness position shown in FIG. 1 to the operating position according to FIG. 2 takes place by releasing the indicator 6 by pressing the second end side 8 of the bar 5 along the first arrow 11, so that measurement of the toxic substance becomes possible. The film 4 is displaced onto the deflecting pin 3 along the second arrow 12 during the movement of the bar 5 along the first arrow 11.

Figure 3:
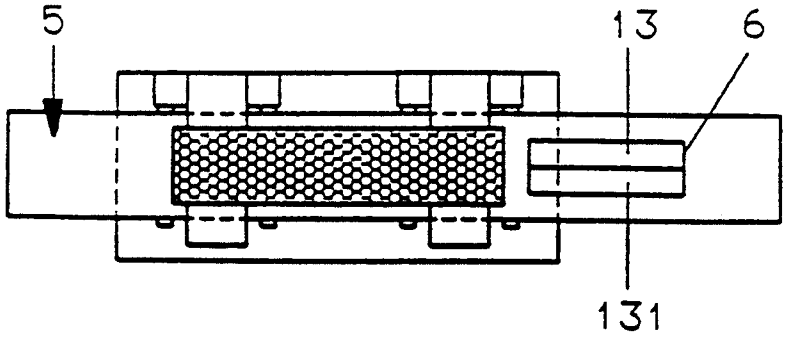
FIG. 3 is a top view of the detection device according to FIG. 2.

FIG. 3 shows a top view of the detection device 1 in the operating position according to FIG. 2. To measure the toxic substance, the indicator 6 is provided with a first indicator zone 13 and a second indicator zone 131. The indicator zones 13, 131 for the quantitative measurement of the toxic substance are designed such that they respond to different concentrations of the toxic substance.

Figure 4:
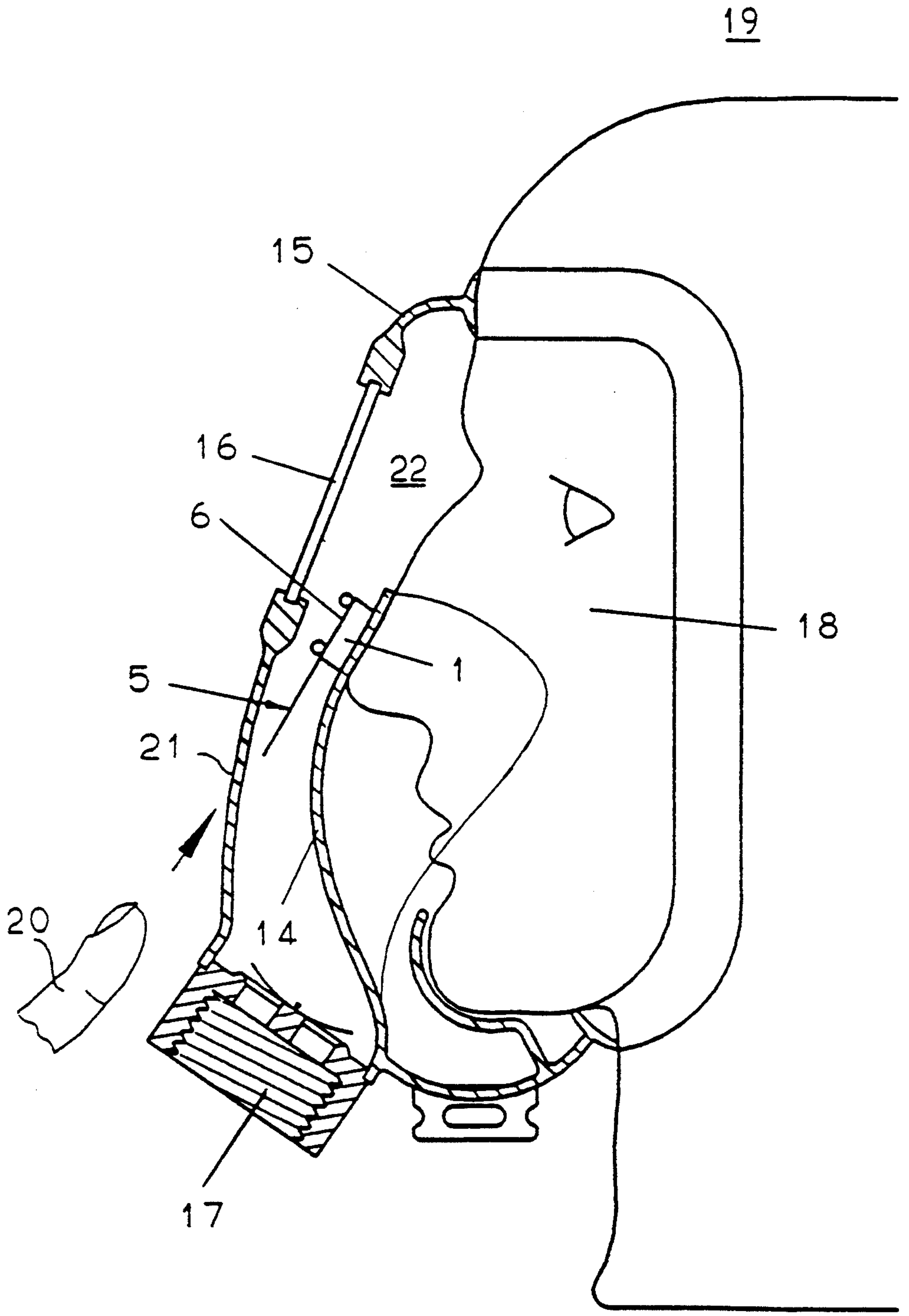
FIG. 4 is a sectional view of a breathing mask with a detection device according to FIG. 1.

FIG. 4 shows an example of the arrangement of the detection device 1 according to the present invention on an inner mask 14 in a mask interior 22 of a breathing mask 15. The detection device 1 is attached to the inner mask 14 by means of a the adhesive layer 10 such that the indicator 6 is recognizable through a mask window 16 of the breathing mask 15. The mask user 18 is supplied with respiration air via a mask connection 17 from, e.g., a fresh air source, not shown in FIG. 4, or via a respiration filter, which is also not shown. One preferred field of application of the detection device is to indicate leaks between the breathing mask 15 and the face of the mask user 18. To do so, the detection device 1 is first attached in the readiness position to the inner mask 14 of the breathing mask 15, and the breathing mask 15 is then put on. The mask user 18 is supplied with respiration gas via the mask connection 17. To test the tightness of the mask, a test gas is blown into the surroundings 19 of the breathing mask 15, and by pressing the bar 5 with his finger 20 from the outside 21 of the mask, the mask user 18 brings the detection device 1 from the readiness position into the operating position, in which the indicator 6 is exposed to the respiration gas in the mask interior 22. If the test gas penetrates into the mask interior 22 as a consequence of leaks, this leads to a change in the color of the indicator 6. This change in color can be recognized by looking through the mask window 16 from the surroundings 19. For example, a person monitoring the test can immediately recognize whether a the breathing mask 15 is untight. Such tests can also be performed during physical work being performed by the mask user 18. Possible prior contamination of the indicator 6 by toxic substance present in the surrounding atmosphere can be avoided by the possibility of putting the detection device 1 into operation with the breathing mask 15 put on.

While a specific embodiment of the invention has been shown and described in detail to illustrate the application of the principles of the invention, it will be understood that the invention may be embodied otherwise without departing from such principles.

What is claimed is:

1. Breathing mask, comprising:

a mask body defining a mask interior inside of said breathing mask through which respiration air flows;

a detection device attached in said mask interior, said detection device including an indicator means for indicating the presence of a toxic substance having penetrated into said mask interior, said detection device including a protective cover for gas tightly surrounding said indicator means said protective cover defining a readiness position of said indicator means and including operating means for bringing said indicator means from said readiness position into an operation position where said protective cover is removed from said indicator means and said indicator means is in contact with the respiration air in the mask interior, said operating means actuated from outside of said mask interior, wherein said indicator means of said detection device is actuated from outside said breathing mask after said breathing mask has been donned by a wearer.

2. Breathing mask according to claim 1, wherein:

said operating means comprises a bar extending towards the outside of the mask, said bar activating said indicator means upon being pushed from outside said mask, wherein said indicator means is slid out from under said protective cover.

3. Breathing mask according to claim 1, wherein:

said detection device includes a holder, said protective cover being formed of a film supported by said holder spanned over two deflecting pins; a bar being provided and guided by said holder, said bar being covered by said film over at least a part of said bar, said bar having a first end with said indicator means formed thereon, said bar including a second end extending toward an outside of said mask and forming said operating means.

4. Breathing mask according to claim 1, further comprising:

an inner mask attached to said mask body, disposed in said mask interior, said detection device being attached to said inner mask of said breathing mask.

5. Breathing mask according to claim 3, further comprising:

an inner mask attached to said mask body, disposed in said mask interior, said detection device being attached to said inner mask of said breathing mask.

6. Breathing mask, comprising:

a mask body defining a mask interior through which respiration air flows, said mask body including a flexible portion;

a detection device positioned in said mask interior and including an indicator means for indicating the presence of a toxic substance which has penetrated into said mask interior, said detection device including a protective cover gas tightly sealing said indication means in a readiness position and including operating means for bringing said indicator means from said readiness position into an operation position whereat said protective cover removed from said indicator means and said indicator means is in contact with the respiration air in the mask interior, said operating means actuated from outside of said mask interior through said flexible portion, wherein said indicator means is actuated from outside said breathing mask after said breathing mask has been donned by a wearer.

7. A breathing mask according to claim 6, wherein said protective cover is formed of a strip-like protective cover extending towards an outside of said mask body for activating the indicator means.

8. Breathing mask according to claim 6, wherein said detection device is formed of a holder support and two deflecting pins connected to said holder support, said protective cover being formed of a film supported by said holder support spanned over said two deflecting pins, a bar being provided guided on said holder support, said bar having a first end with said indicator means formed thereon and having a second end extending toward an outside of said mask body and forming said operating means.

9. A breathing mask according to claim 6, further comprising:

an inner mask attached to said mask body, said inner mask being disposed in said mask interior, said detection device being attached to said inner mask.

10. Breathing mask, comprising:

a mask body defining a mask interior inside of said breathing mask through which respiration air flows;

a detection device being attached in said mask interior including an indicator means for indicating the presence of a toxic substance having penetrated into said mask interior, said detection device including a strip-like protective cover that gas tightly surrounds said indicator means said strip-like protective cover extending towards the outside of said mask defining a readiness position of said indicator means and including operating means for bringing said indicator means from said readiness position into an operation position where said protective cover is removed from said indicator means and said indicator means comes into contact with the respiration air in the mask interior, said operating means actuated from outside of said mask interior, wherein said indicator means of said detection device is actuated from outside said breathing mask after said breathing mask has been donned by a wearer.

* * * * *